(12) United States Patent
Waizenegger (10) Patent No.: US 8,632,110 B2
(45) Date of Patent: Jan. 21, 2014

(54) GRIPPING DEVICE

(71) Applicant: Multivac Sepp Haggenmüller GmbH & Co. KG, Wolfertschwenden (DE)

(72) Inventor: Kurt Waizenegger, Aitrach (DE)

(73) Assignee: Multivac Sepp Haggenmueller GmbH & Co. KG, Wolfertschwenden (DE)

( * ) Notice: Subject to any disclaimer, the term of this patent is extended or adjusted under 35 U.S.C. 154(b) by 0 days.

(21) Appl. No.: 13/687,211

(22) Filed: Nov. 28, 2012

(65) Prior Publication Data

US 2013/0134726 A1    May 30, 2013

(30) Foreign Application Priority Data

Nov. 29, 2011   (DE) .......................... 10 2011 119 659

(51) Int. Cl.
  *B25J 15/00*    (2006.01)
  *B25J 15/04*    (2006.01)

(52) U.S. Cl.
  USPC .................... 294/86.4; 294/119.1; 294/902

(58) Field of Classification Search
  USPC ............ 294/2, 86.4, 119.1, 11, 9.3, 196, 207, 294/99.1, 902; 901/37, 39
  See application file for complete search history.

(56) References Cited

U.S. PATENT DOCUMENTS

| 1,049,150 | A | * | 12/1912 | Robail | ............................ | 294/65 |
| 2,589,101 | A | * | 3/1952 | Leguillon et al. | ............. | 414/619 |
| 3,322,455 | A | * | 5/1967 | Gressbach | .................... | 294/104 |
| 3,934,702 | A | | 1/1976 | Snyder et al. | | |
| 3,954,194 | A | * | 5/1976 | Stedman | ........................ | 414/550 |
| 4,641,876 | A | * | 2/1987 | Kiser et al. | ................... | 294/86.4 |
| 5,026,104 | A | * | 6/1991 | Pickrell | ........................ | 294/86.4 |
| 5,245,885 | A | * | 9/1993 | Robertson | .................. | 74/490.01 |
| 5,398,983 | A | * | 3/1995 | Ahrens | .......................... | 294/106 |
| 5,562,386 | A | * | 10/1996 | Browning | ..................... | 414/408 |
| 8,157,308 | B2 | * | 4/2012 | Pedersen | ....................... | 294/213 |
| 8,287,015 | B2 | * | 10/2012 | Hawes | ......................... | 294/86.4 |
| 2002/0005646 | A1 | | 1/2002 | Bliss et al. | | |

FOREIGN PATENT DOCUMENTS

| DE | 3712939 A1 | 11/1988 |
| DE | 9104207 U1 | 9/1991 |
| DE | 102009012331 A1 | 9/2010 |
| DE | 102009030012 A1 | 12/2010 |
| DE | 102010023337 A1 | 12/2011 |
| DE | 102011109967 A1 | 2/2013 |
| EP | 0569674 A1 | 11/1993 |
| EP | 2039632 A1 | 3/2009 |
| EP | 1986941 B1 | 12/2009 |
| WO | 2005051812 A1 | 6/2005 |

* cited by examiner

*Primary Examiner* — Dean Kramer (74) *Attorney, Agent, or Firm* — Husch Blackwell LLP (57) ABSTRACT

The invention relates to a gripping device for picking up and transporting a product. An elastic belt that is provided on the gripping device lies against a surface section of the product when the product is picked up by the gripping device. The elastic belt can thereby be pressed against the surface section of the product by at least one spring element in order to hold the product securely in the gripping device during transport.

14 Claims, 5 Drawing Sheets

GRIPPING DEVICE

CROSS-REFERENCE TO RELATED APPLICATIONS

This application claims priority to German Application Number 102011119659.9 filed Nov. 29, 2011, to Kurt Waizenegger entitled "Gripping Device," currently pending, the entire disclosure of which is incorporated herein by reference.

FIELD OF THE INVENTION

The present invention relates to a gripping device that is suitable for picking up and transporting products, principally food products.

BACKGROUND OF THE INVENTION

EP 1 986 941 B1 describes a handling device for picking up a product. The device comprises a pick-up plate with a movable belt that is brought underneath the product in order to pull the product on to the pick-up plate.

A gripping device with a hold-down element is known from EP 2 039 632 A1. The gripping device comprises a first and a second gripper arm, whereby the hold-down element is arranged in between. While a product is being picked up in the gripping device, the gripper arms are moved towards each other, as a result of which the hold-down element folds in such a manner that the folds press the picked-up product against the gripper arms. When the gripper arms move apart in order to hand over the picked-up product, the folds are extended, as a result of which the hold-down element moves away from the product.

The later published DE 10 2011 109 967 A from the applicant relates to a gripping device with a plate for picking up products. An endless belt that is movable relative to the plate is arranged on the plate and as a result simplifies picking up the product on to the plate.

A gripping device for picking up products is also described in the later published DE 10 2010 023 337 A of the applicant. The gripping device comprises a first and a second gripper arm that are arranged such that they are movable relative to each other along a guide. Each gripper arm comprises a plate that can be slid underneath the products in order to pick up the same.

While in practice picking up products, particularly food products, usually takes place without trouble, it is difficult to transport the picked-up product quickly and reliably. It is therefore important that the picked-up product be put down accurately at a predetermined point in order to feed it optimally to a following working process, for example, a packaging process.

In particular, it can be that during an accelerated displacement of the gripping device, the product, because of its inertia in the gripping device, shifts in such a manner that the product can no longer be put down accurately. In the worst case, it can be that the product falls out of the gripping device during the transport.

In particular, the accelerations of the gripping device itself can lead to the product failing to remain in a predetermined position in the gripping device.

Because in practice it is not possible to ensure completely that the picked-up product is put down by the gripping device exactly at that point at which it is desired, additional human resources are required in order to check and, where applicable, correct the position of the product that is put down.

SUMMARY OF THE INVENTION

The object of the present invention is based on improving a gripping device by means of simple technical and design features to the effect that said device can carry out a trouble-free pick up of products and can reliably transport and accurately handover the same in spite of high accelerations of the gripping device.

The gripping device according to the invention is suitable for picking up and transporting products, particularly food products. The gripping device comprises an elastic belt that lies against a surface section of the product that is to be transported when this product is picked up by the gripping device.

According to one embodiment of the invention, it is provided that the elastic belt can be pressed against the surface section of the product by at least one spring element in order to hold the product in a stationary manner in the gripping device during the transport.

When the elastic belt presses against the product, a pressing force acts on the belt and on the spring element. The pressing force pre-tensions the spring element as a result of which the product can be held stably in the gripping device.

Because the spring element presses the belt against the product, the product itself can be transported reliably and accurately to a predetermined location even in the event of large accelerations of the gripping device.

The invention also makes it possible to prevent the product from shifting in the gripping device or possibly even falling out of said device when the gripping device is accelerated.

Because the gripping device according to the invention ensures that the transported product is put down accurately, it is possible to eliminate additional workers who inspect a delivery position of the product. This leads to greater process reliability.

As a result of the interaction of the spring element with the elastic belt, the product can be picked up in the gripping device and transported so reliably that the product remains stationary in the gripping device even in the event of extreme accelerations of the gripping device. Because the gripping device can be subjected to greater accelerations, an improved throughput rate is possible for products, as a result of which the yield increases.

In one embodiment of the invention, the elastic belt is attached to the gripping device in a detachable manner, particularly in a manner that does not use tools or fasteners. This offers the advantage that the elastic belt can be removed from the gripping device for cleaning purposes in order to satisfy the strict hygiene requirements in the food industry. In addition to this, the detachable elastic belt can be exchanged easily when there is a change of product. The belt is may be buttoned on to the gripping device in a detachable manner, as a result of which a simple and quick attachment can be made. For this purpose, it can be provided that only openings or slits are formed into the belt, particularly on its outer ends, whereby attachment elements of the gripping device can be inserted into these openings or slits. This offers an economical solution for attaching the belt quickly and simply to the gripping device.

In a further embodiment of the invention, it is provided that the elastic belt has a ribbing on its surface. The ribbing ensures a particularly good grip between the belt and the product and can prevent the product from shifting along the elastic belt even if large accelerations act on the gripping device. The ribbing can thereby be provided with different contours for different products.

The elastic belt may have a thickness of from about 1 to about 3 mm, principally a thickness of roughly 2 mm. By means of such a belt thickness, the belt remains stable even after a large number of operating hours by the gripping device. Furthermore, in this way it is possible to achieve a desired bending strength for the belt in order for the belt to be brought to lie optimally against the product. According to a further improvement of the invention, the elastic belt has a Shore hardness of from about 60 to about 80 Shore A or D, preferably 70 Shore A or D. In this way it is possible to achieve a desired elasticity in the elastic belt. Due to the mentioned Shore hardness range, it can also be ensured that the elastic belt is able to spring back into the initial state after a deformation.

Hygiene standards can be fulfilled particularly well if the elastic belt is a silicone belt. The silicone belt can be easily cleaned and is not susceptible to the settlement of bacteria or other unwanted cultures. The silicone belt furthermore does not absorb moisture or odors from food, for which reason it can be used for different food products without trouble.

In a further embodiment of the invention, it is provided that the elastic belt is attached to the gripping device in such a manner that it pre-tensions the spring element. In this way, the belt can optimally come into contact with the product that is to be picked up, and the belt can be pressed against this product and fix this product in place in the gripping device. In addition, the belt can be held tautly by the pre-tensioned spring element in such a manner that no unwanted folds form in the elastic belt. Due to the pre-tensioned spring element and the belt that is held tautly on it, it is furthermore possible to reduce noise development during the transport, particularly when the gripping device is accelerated without a picked-up product.

As an alternative to this, it is provided that the elastic belt may be attached to the gripping device in such a manner that it is spaced some distance d apart from the spring element. According to this embodiment of the invention, the belt does not lie against the spring element nor does it pre-tension said spring element. The spring element may be consequently in a released state. The belt is thereby arranged loosely on the gripping device in such a manner that it itself first deforms by the distance d when the product is picked up before it comes into contact with the spring element and pre-tensions this spring element. The belt consequently first deforms against the deformation resistance specifically provided, whereby this deformation resistance is determined on the basis of the elastic property and/or the shape of the belt. In this way it is achieved that the product that is to be picked up comes into contact with the belt in an especially gently manner, because only the elastic property and/or the shape of the belt exert a cushioning on the product and because there is no immediate pressing against the spring element. This is particularly advantageous for picking up products carefully with the gripping device without deforming the products.

The strict hygiene requirements in the food industry also benefit if the spring element is arranged on the gripping device in a detachable manner. This can particularly be helpful during cleaning processes or also if the spring element has to be replaced. It can also be provided that different spring elements are used depending on the transported goods, in order to ensure a desired pressing force for the belt. Spring elements that differ with regard to their shape or spring rate could thereby be used.

The spring element can be attached to the gripping device in a trouble-free and stable manner if said spring element has an attachment element, principally an attachment lug, provided for this purpose.

The elastic belt can be pressed against the surface section of the product especially well if the spring element is an elastic expansion bellows. The elastic expansion bellows can be pressed together in the manner of an accordion when the belt presses on it. When the belt no longer presses on the expansion bellows, the expansion bellows returns to its original extension. For reasons of hygiene, the expansion bellows can be made of silicone or another plastic for easy cleaning. The expansion bellows may likewise be light spring element which is well-suited for accelerations of the gripping device. Alternatively to this, instead of the expansion bellows, the spring element can be only an elastic spring or an elastic foam element in order to cushion the belt effectively.

The spring element, principally the expansion bellows, can be formed as a pneumatic spring. The air that is displaced when the pneumatic spring is pressed together can escape, for example, through an outlet that may be formed in the attachment element. For this purpose, the expansion bellows can be formed so as to be hollow, whereby the air displaced from it flows through the outlet when the belt presses against the expansion bellows. The cushioning effect achieved in this way can be varied by means of changing the size of the outlet. The outlet can be formed in the attachment lug that is attached to the gripping device for the arrangement of the spring element.

According to one embodiment, the gripping device comprises a rail that is provided for the attachment of the elastic belt. The rail offers an outstanding attachment possibility for the elastic belt and contributes to the general stability of the gripping device.

It is furthermore possible to provide the rail for the attachment of the spring element, whereby the spring element is attached to the rail in such a manner that it is arranged between the rail and the elastic belt. If a product that has been picked up exerts a force against the elastic belt, this elastic belt presses against the spring element which is held by the rail. The rail offers a stable basis on which the cushioning effect of the spring element can be exerted on the belt in an especially advantageous manner.

For the pick-up and transport, the gripping device can be equipped with at least a first gripper arm that simplifies picking up the product in the gripping device. The gripper arm is may be formed so that it is movable relative to the product when the product is picked up. The first gripper arm can act in combination with a rigid or movable second gripper arm in such a manner that the product can be picked up well and transported reliably.

The gripping device can have a central clamp that is suitable for a detachable attachment to a movable robot arm. In this way, the gripping device can be put to use especially effectively in practical application.

In one embodiment, the gripping device is part of a transfer system which is used particularly in packaging lines in the food industry. Due to the possibility of large accelerations, the gripping device can be used there in a particularly profitable manner.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Identical components are designated by identical reference numerals throughout the figures.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
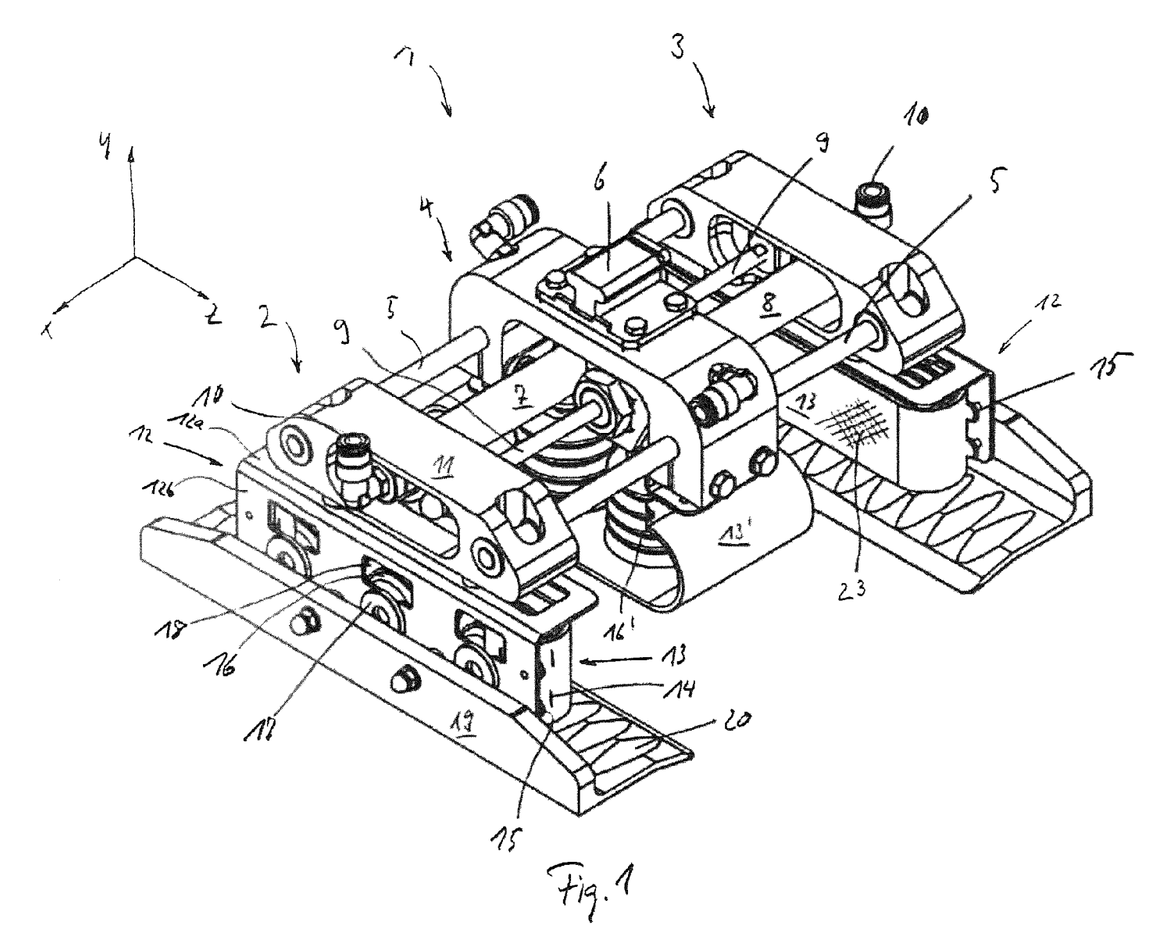
FIG. 1 is a perspective view of the gripping device in accordance with one embodiment of the present invention.

FIG. 1 shows a gripping device 1 according to the invention for picking up and transporting products. The gripping device 1 is thereby aligned relative to an x, y and z-direction. The gripping device 1 comprises a first and a second gripper arm 2, 3 as well as a clamp 4 that is arranged between the gripper arms 2, 3. The two gripper arms 2, 3 are arranged such that either one or both are movable relative to the clamp 4. They can be moved along guide rods 5 that are attached to the clamp 4 and that extend in the x-direction.

Figure 2:
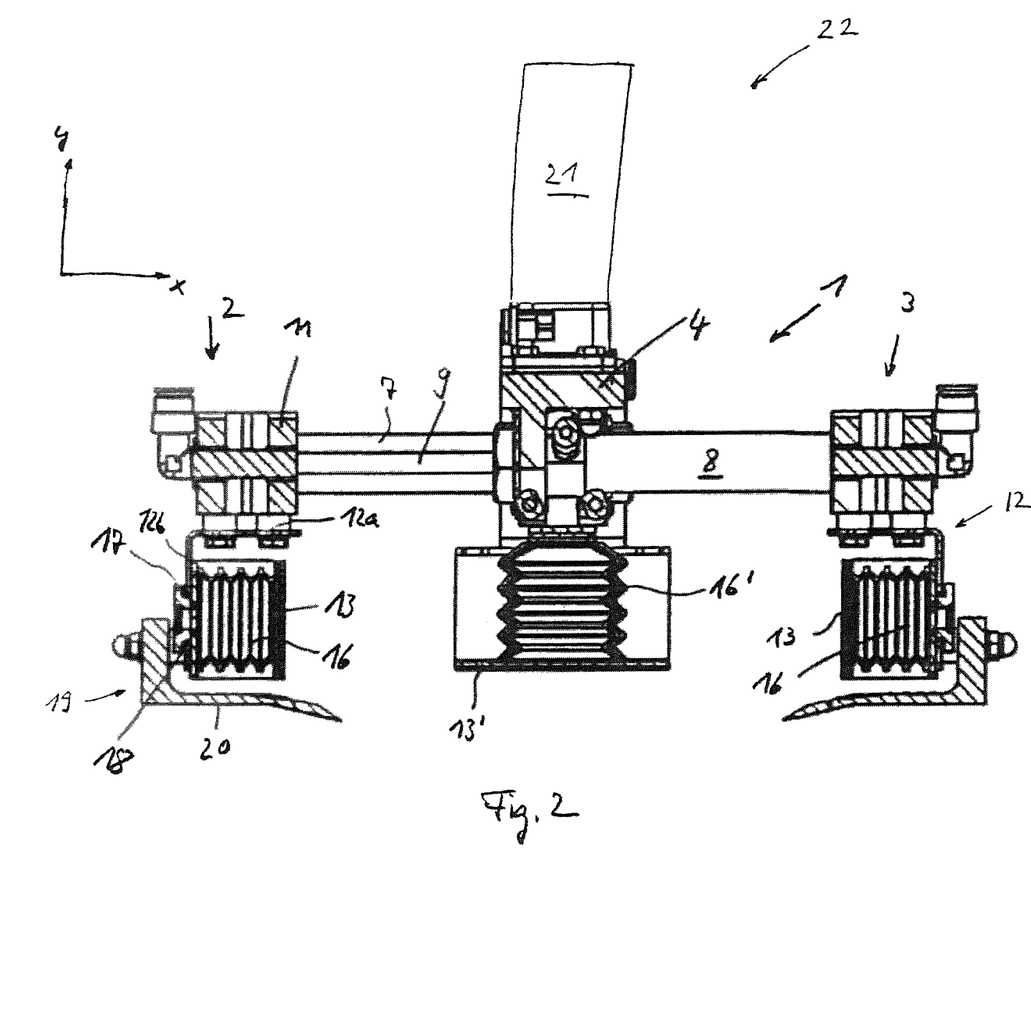
FIG. 2 is a sectional representation of the gripping device in accordance with one embodiment of the present invention.

A holder 6 is provided on the clamp 4, whereby the holder 6 may be used for the attachment of the gripping device 1 to a movable robot arm 21 that belongs to a transfer system 22 (see FIG. 2). The holder 6 may be formed as a T-shaped closure, but it can deviate from this shape or it can also comprise a magnetic closure, principally with an electromagnet.

In addition, a first and a second piston-cylinder unit 7, 8 may be arranged on the clamp 4 and extend in the x-direction between the guide rods 5 according to FIG. 1. The first and the second piston-cylinder unit 7, 8 each comprise a movable piston 9. The movable piston 9 of the first piston-cylinder unit 7 is connected on its end to the second gripper arm 3 and the movable piston 9 of the second piston-cylinder unit 8 is connected on its end to the first gripper arm 2. The first and the second piston-cylinder unit 7, 8 each comprise a connection point 10 that is used, for example, for the connection of pneumatic hoses. The first and the second piston-cylinder unit 7, 8 can be driven independently of each other with a pressurizing agent, principally compressed air, in order to move the first and/or the second gripper arm 2, 3 in the x-direction.

According to FIG. 1, the first and the second gripper arm 2, 3 comprise the same technical features. For this reason, only the construction of the first gripper arm 2 is described in the following.

The first gripper arm 2 comprises a guide component 11 that is arranged such that it can be moved along the guide rods 5. The guide component 11 is preferably made from a plastic that slides well on the guide rods 5 and that does not contribute significantly to the total weight of the gripping device 1. A rail 12 is attached below the guide component 11. The rail 12 can be formed with a right angle and can comprise a first and second side piece 12a, 12b. The rail 12 can be manufactured from stainless steel, but is not limited to this material. A belt 13 can be arranged between the two side pieces 12a, 12b. The belt 13 is attached to the second side piece 12b in such a manner that it runs in the z-direction essentially along the rail 12, particularly along the second side piece 12b. In particular, a substantial section of the belt 13 runs parallel to the second side piece 12b of the rail 12. The belt 13 may comprise a ribbing 23 that is shown by way of example on the belt 13 of the second gripper arm 3. The ribbing 23 is shown only in sections in FIG. 1. The ribbing 23 is, however, preferably formed on the entire surface of the belt 13, said surface being the one that faces towards the product. The ribbing 23 ensures an improved grip between the belt 13 and the product that is to be picked up.

Openings or slits 14 are provided in the belt 13 in order to attach the belt 13 to the rail 12. The slits 14 are formed close to the outer ends of the belt 13. The slits 14 can be slid or buttoned over attachment projections 15 provided on the rail 12 in order to attach the belt 13 to the rail 12. The attachment projections 15 can have a mushroom-shaped head that prevents the belt 13 from loosening from the rail 12. The attachment projections 15 can be seen clearly on the rail 12 of the second gripper arm 3.

In one embodiment, three spring elements 16 are arranged next to one another between the belt 13 and the rail 12. Each of the spring elements 16 may be formed as an expansion bellows according to FIG. 1, and they can be pre-tensioned essentially in the x-direction by a force on the belt 3.

Each of the spring elements 16 can comprise an attachment lug 17 that is provided for the attachment of the spring element 16. The attachment lug 17 is attached in an opening 18 in the rail 12. The opening 18 of the rail 12 is formed in the second side piece 12b according to FIG. 1. The attachment lug 17 can be slid into the opening 18 of the rail 12 in such a manner that the spring element 16 is attached securely to the rail 12, particularly in the x-direction. The spring element 16 can be removed from the opening 18 by being slid upwards in the y-direction.

FIG. 1 furthermore shows a blade 19 that is attached to the rail 12. The blade 19 comprises a supporting edge 20 that grips under the product that is to be picked up. The supporting edge 20 extends below along the belt 13 and the spring elements 16 that are arranged between the belt 13 and the rail 12.

Spring elements 16' and an elastic belt 13' that extends in the z-direction can be arranged underneath the clamp 4. An attachment of the spring elements 16' and the elastic belt 13' can be made in a manner similar to that described previously with regard to the first gripper arm 2. However, the spring elements 16' and the elastic belt 13' can be formed so as to be larger than the spring elements 16 and the elastic belt 13 of the first or second gripper arm 2, 3. The spring elements 16' and the elastic belt 13' can be pre-tensioned in essentially the y-direction.

FIG. 2 shows a sectional representation of the gripping device in the x-y plane. The first and the second piston-cylinder units 7, 8 hold the first and the second gripper arm 2, 3 relative to the clamp 4. The divided spring element 16 can be seen on the first and the second gripper arm 2, 3, whereby this divided spring element 16 is arranged in the effective direction x between the belt 13 and the rail 12, particularly the second leg piece 12b. The spring element 16, along with its attachment lug 17, is slid through the opening 18 of the rail 12. According to FIG. 2, the belt 13 lies against the spring element 16. The spring element 16 can, for example, also be pre-tensioned by the belt 13.

FIG. 2 furthermore shows that the supporting edge 20 of the blade 19 extends in the x-direction below the tensioned belt 13 and the spring element 16.

The sectional view of FIG. 2 also shows the spring element 16', which is arranged between the belt 13' and the clamp 4. The spring, element 16', which is executed as an expansion bellows, is aligned in the y-direction and is pressed together upwards against the clamp 4 by a force from below on to the belt 13'. According to FIG. 2, the belts 13, 13' are arranged in such a manner that the spring elements 16, 16' are pre-tensioned. When a force acts against the belts 13, 13', then these can be moved relative to the rail 12 or to the clamp 4 by pre-tensioning the spring elements 16,16'.

Figure 3:
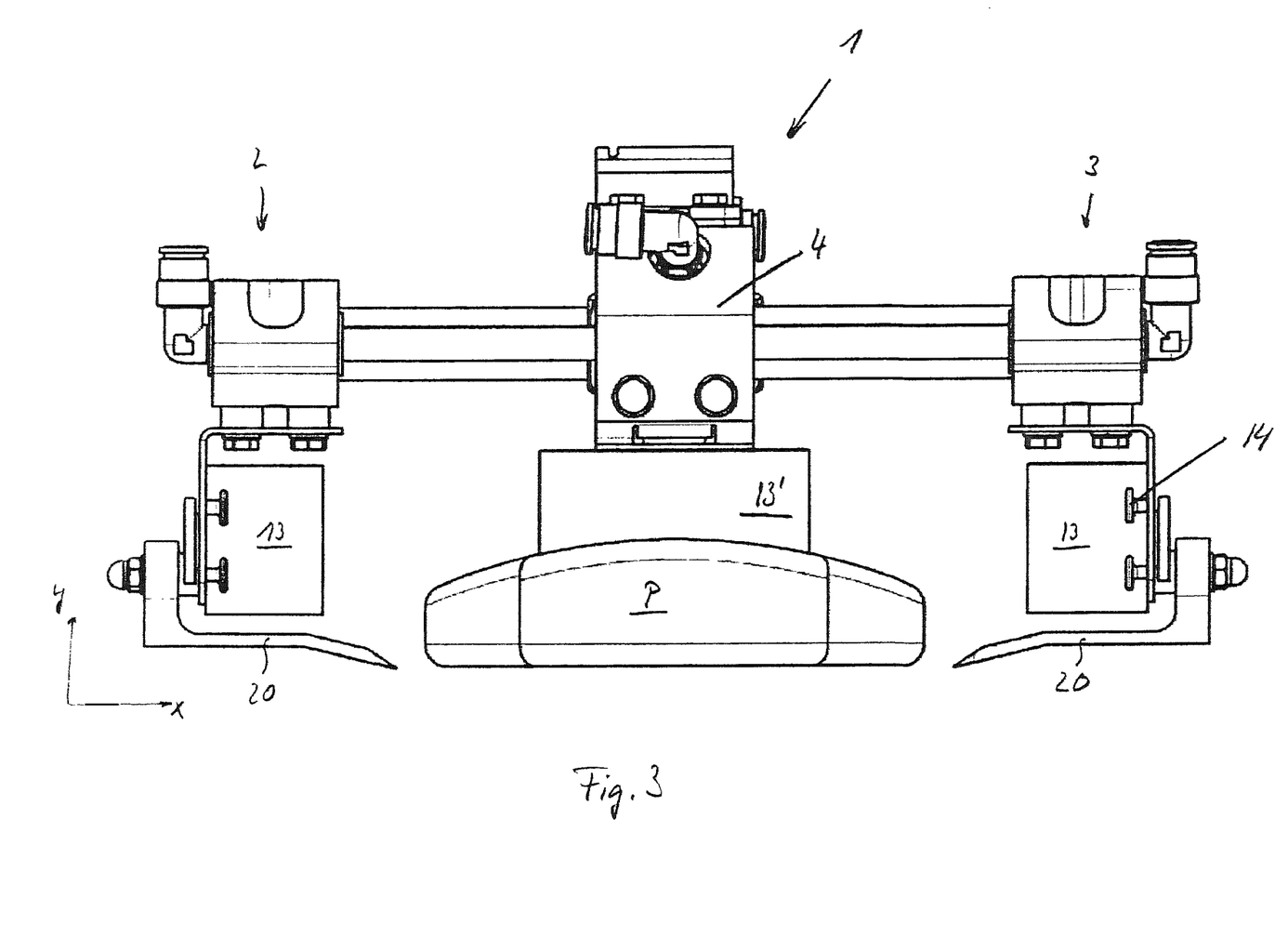
FIG. 3 is a front view of the gripping device when picking up a product in accordance with one embodiment of the present invention.

FIG. 3 shows the gripping device 1 above a product P. The elastic belt 13', which is arranged below the clamp 4, lies against a surface section of the product P. The belt 13 can thereby adapt to the surface section of the product P or, in the case of an appropriate belt thickness, it can press essentially horizontally on to the product as a result of which the surface section of the product is pressed flat.

When the first and/or the second gripper arm 2, 3 moves in the x-direction towards the clamp 4, the supporting edge 20 of the first and of the second gripper arm 2, 3 slides under the product. If the two gripper arms 2, 3 are moved farther in the direction of the clamp 4, the product 4 then bumps against the elastic belts 13 of the first and of the second gripper arm 2, 3. Consequently, the product P can be fixed in place in both the x- and the y-directions, whereby the product P is fixed in place in the x-direction by the belts 13 and in the y-direction above by the belt 13' and below by the supporting edges 20.

Figure 4:
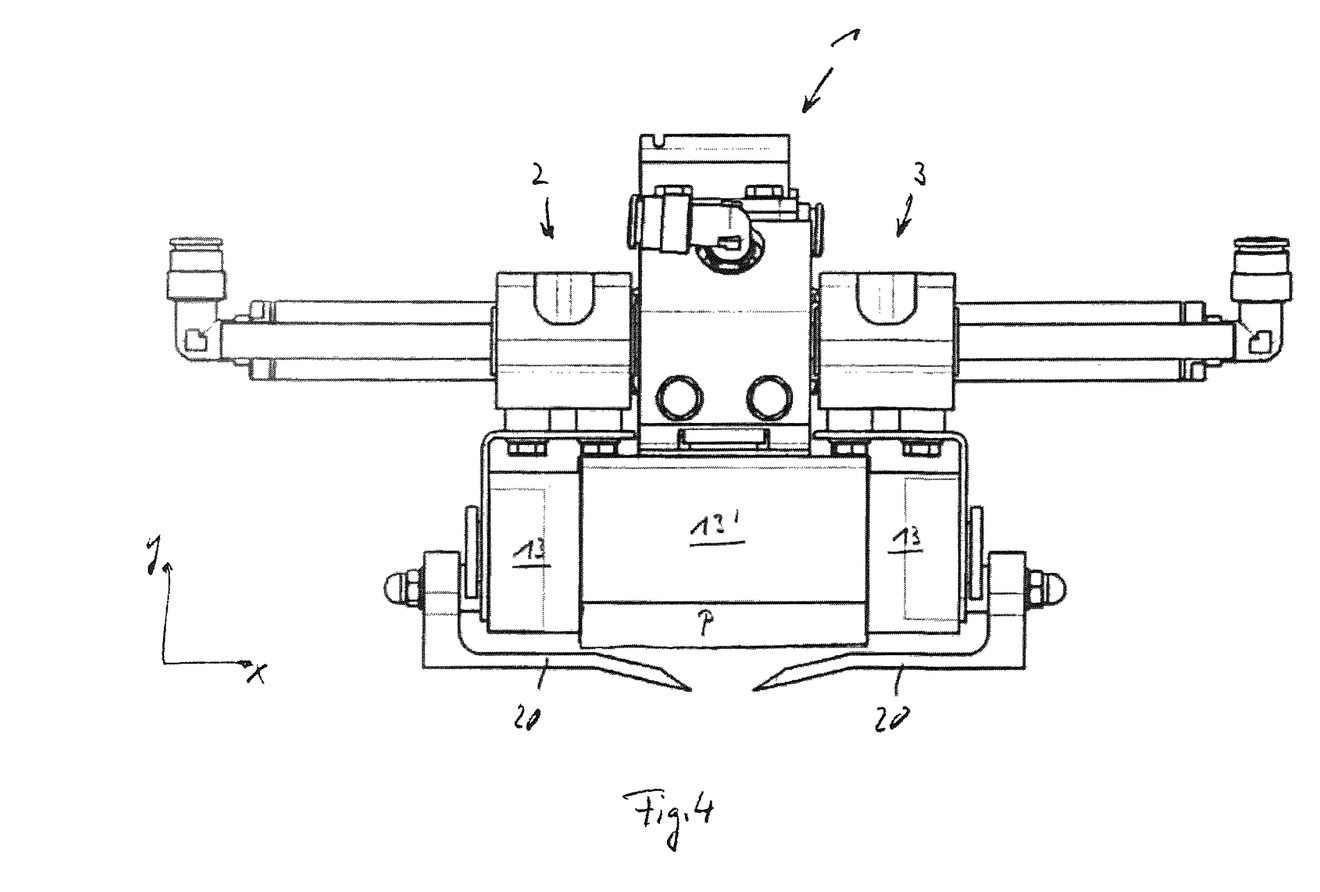
FIG. 4 is a front view of the gripping device with a picked-up product during the transport in accordance with one embodiment of the present invention.

The fixation of a product P (possibly with dimensions other than those in FIG. 3) can be seen clearly in FIG. 4. There the gripping device 1 is depicted with the gripper arms 2, 3 driven together. The gripper arms 2, 3 are thereby driven completely to the clamp 4. The product P is held firmly in the gripping device 1. The product P lies against the supporting edge 20 of the first and of the second gripper arm 2, 3, while it is fixed in place at its sides and from above by the elastic belts 13, 13'.

Figure 5:
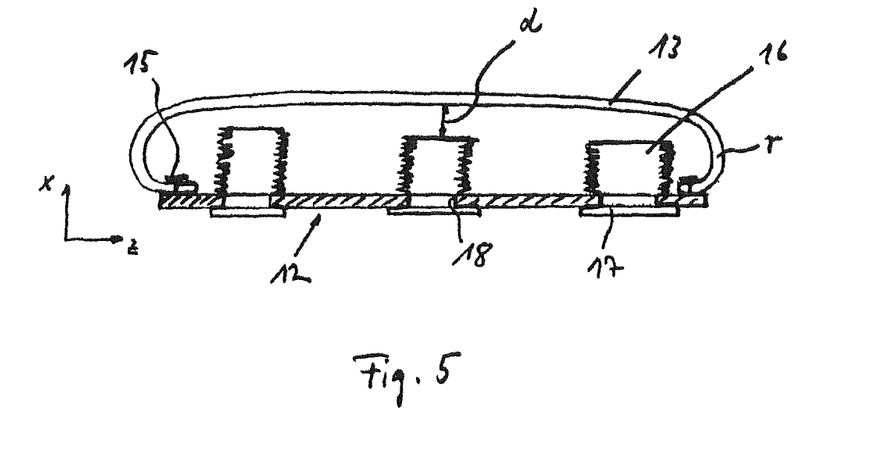
FIG. 5 is a sectional representation of the rail with the attached belt in the x-z plane in accordance with one embodiment of the present invention.

FIG. 5 shows a sectional representation of the rail 12 with the attached belt 13 in the x-z plane. The belt 13 is attached to attachment projections 15 on its outer ends in each case, whereby the attachment projections 15 stand out from the rail 12. Three spring elements 16 are arranged in a row on the rail 12 or on its side piece 12b. The attachment lug 17 of the respective spring element 16 is slid through the associated opening 18 of the rail 12 and attached in the same. The belt 13 is arranged on the rail 12 in such a manner that on each of its outer ends it forms a radius r so that an essential section of the belt 13 runs essentially parallel to the rail 12. FIG. 5 furthermore shows that the belt is spaced at a distance from the three spring elements 16. The distances between the belt 13 and the respective spring elements 16 can be of equal or different sizes. In particular, the belt 13 is spaced a distance d from the centered spring element 16.

Figure 6:
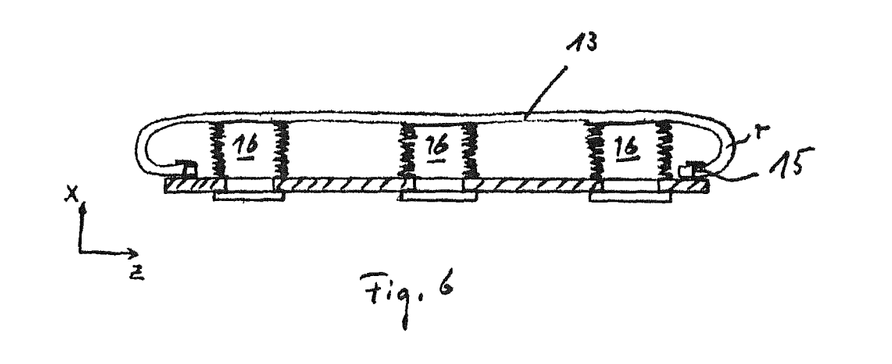
FIG. 6 is a sectional representation of the rail with the attached belt in the x-z plane in accordance with another embodiment of the present invention.

FIG. 6 shows a fixation of the belt to the rail 12, whereby this fixation is an alternative to that shown in FIG. 5. The belt 13 is thereby likewise held on its outer ends to the respective attachment projections 15. The belt 13 according to FIG. 6, however, lies against the three spring elements 16 or even pre-tensions these in accordance with a further embodiment. The belt 13 here is consequently not spaced at a distance from the spring elements 16. Due to the fact that the belt 13 is in contact with the spring elements 16, the radius r is less than that shown in FIG. 5.

The belt fixation according to FIG. 5 or FIG. 6 can be used for both the first and/or the second gripper arm 2, 3 and for the fixation of the belt 13' on the clamp 4.

The use of the gripping device 1 according to the invention can take place in different industrial sectors. The transfer of different products can thereby be involved.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A gripping device for picking up and transporting a product, the gripping device comprising:
   a first and a second gripper arm;
   a central clamp configured to be connected to a movable robot arm, the central clamp being arranged between the first and second gripper arms,
   wherein each of the first gripper arm, the second gripper arm and the clamp comprise
      an elastic belt that lies against a surface section of the product when the product is picked up by the gripping device; and
      at least one spring element;
   wherein the elastic belt of the first gripper arm, the second gripper arm, and the central clamp can be pressed against the surface section of the product by the at least one spring element in order to hold the product in the gripping device in a stationary manner during the transport, wherein the product is held in a first direction by the elastic belts of the first and the second gripper arms and is held in a second direction that is orthogonal to the first direction by the elastic belt of the central clamp.

2. The gripping device of claim 1, wherein at least one of the elastic belts is attached to one of the gripping arms and the clamp in a detachable manner.

3. The gripping device of claim 1, wherein at least one of the elastic belts has a ribbing on its surface.

4. The gripping device of claim 1, wherein at least one of the elastic belts has a thickness of from about 1 mm to about 3 mm.

5. The gripping device of claim 1, wherein at least one of the elastic belts is a silicone belt.

6. The gripping device of claim 1, wherein at least one of the elastic belts is attached to the gripping arms and the clamp in such a manner that the elastic belt pre-tensions the spring element.

7. The gripping device of claim 1, wherein at least one of the elastic belts is attached to the gripping arms and the clamp in such a manner that the elastic belt is spaced at a distance from the spring element.

8. The gripping device of claim 1, wherein at least one of the spring elements is arranged on the gripping arms and the clamp in a detachable manner.

9. The gripping device of claim 1, wherein at least one of the spring elements has an attachment element in the form of an attachment lug.

10. The gripping device of claim 1, wherein at least one of the spring elements is an elastic expansion bellows.

11. The gripping device of claim 1, wherein at least one of the spring elements is formed as a pneumatic spring.

12. The gripping device of claim 1 wherein each of the gripping arms and the clamp further comprise a rail for the attachment of the elastic belt.

13. The gripping device of claim 12, wherein each of the spring elements is attached to the respective rail in such a manner that said spring element is arranged between the rail and the elastic belt.

14. The gripping device of claim 1, wherein the gripping device is incorporated into a transfer system for picking up and transporting products.

* * * * *